United States Patent Office 3,795,665
Patented Mar. 5, 1974

3,795,665
POLYOXYALKYLENE LIGNIN COMPOSITIONS
AND PROCESS FOR PRODUCING SAME
Charles H. Ludwig, Bellingham, Wash., assignor to
Georgia-Pacific Corporation, Portland, Oreg.
No Drawing. Filed Nov. 13, 1972, Ser. No. 305,909
Int. Cl. C07g 1/00
U.S. Cl. 260—124 R                               22 Claims

ABSTRACT OF THE DISCLOSURE

Water-soluble compositions of lignin cross-linked with polyoxyalkylene linkages are described. The compositions are prepared by reacting lignin with a polyoxyalkylene di-ester of a monosulfonic acid or a polyoxyalkylene dihalide to obtain high molecular weight compositions which are effective as thickening and flocculating agents.

---

This application relates to novel lignin compounds and a process for their preparation. More particularly, it pertains to a product and a process for the preparation of high molecular weight compositions of lignins crosslinked with polyoxyalkylene linkages to obtain the thickening agents or effective coagulants or flocculating agents.

One of the major contributors to pollution of streams and waterways is the effluents discharged into the waterways without proper treatment to remove the fine, colloidal particles of solids dispersed in the effluents. While the large particles may settle out without difficulty, the fine solids do not settle and have to be treated with a flocculating agent or coagulant to coagulate or aggregate the particles before settling. Multivalent salts such as ferric chloride and aluminum sulfate are commonly used for particular systems but are of limited effectiveness even in the systems used. The more effective organic polyelectrolytes are relatively expensive and cannot be economically used in many applications.

The surface active properties of lignins and lignosulfonates have long been recognized, and these products have been used as dispersing and flocculating agents. While it has been known for a number of years that high molecular weight lignins and lignosulfonates, such as obtained by fractionation or polymerization of pulping liquors, function as flocculating agents, these materials do not have sufficient effectiveness for commercial acceptance and are suggested for use mainly as flocculating aids in conjunction with other flocculating agents. Polymerization of lignosulfonates and the reaction of lignins with aldehydes and other reagents, such as disclosed in United States Letters Patent Nos. 3,470,148 and 3,600,- 308, have not improved the effectiveness of these materials sufficiently to make them commercially attractive.

It is therefore the object of this invention to prepare unique high molecular weight compositions of lignins. A further object is to provide water-soluble, high molecular weight lignin compositions which are effective as flocculating or thickening agents and a process for their use. A still further object is to provide a method for cross-linking of lignin.

The above and other objects are attained, according to this invention, by cross-linking lignin with polyoxyalkylene linkages having a molecular weight in the range of from 120 to 1,000 to cross-link or bridge the lignin molecules to the extent that an effective flocculating agent is obtained. The cross-linking reaction is carried out by intermixing the lignin with a terminal di-ester or dihalide of polyoxyalkylene and reacting the mixture in an aqueous medium under alkaline conditions. By cross-linking or bridging the lignin with the polyoxyalkylene linkages, a composition is obtained where the lignin is cross-linked or bridged by long polyoxyalkylene chains resulting in the formation of molecules having large three dimensional, irregular entities held together at a distance from each other by non-rigid bonding of a hydrophilic nature. These products when dissolved in aqueous medium form loosely bound, flexible molecules having increased surface area for the adsorption or entrapment of fine colloidal particles in solution to result in flocculation of these particles.

Lignins are polymeric substances composed of substituted aromatics found in plant and vegetable tissue associated with cellulose and other plant constituents. In the pulp and paper industry, lignin-containing materials such as wood, straw, corn stalks, bagasse, and other vegetable and plant tissues are processed to recover the cellulose or pulp. The residual pulping liquors containing the lignin as by-products are thus one of the main sources of lignins. While there is some variation in the chemical structure of lignin, depending upon the plant from which lignin is obtained, place where the plant is grown, and also upon the method used in recovery or isolation of the lignin from the plant tissue, the basic structure and properties of the lignins are similar, all containing the phenolic hydroxyls through which the cross-linking or bridging is believed to be effected. Thus, lignins obtained by any method or from any source may be used in this reaction as long as the lignin is in a form soluble in an aqueous alkaline medium.

Since the lignins separated from the plant may be chemically altered somewhat from that found in the plant, the term "lignins," as used herein, means the lignin products which are obtained upon separation from the cellulose or recovered from the plant. In the sulfite pulping process, the lignocellulosic material is digested with a bi-sulfite or sulfite resulting in the sulfonation of the lignins. In other methods of the recovery or separation of the lignins from the plant, the lignins may not be sulfonated but may be chemically altered somewhat in some other manner. For example, in residual pulping liquors obtained in the sulfate and other alkaline pulping processes, the lignins are present as alkaline metal salts dissolved in the alkaline aqueous liquor. "Hydrolysis lignin" obtained from the hydrolysis of lignocellulosic materials in manufacture of sugar is likewise altered somewhat from that found in the plant but is water insoluble and has to be further modified before it can be used. Also, the lignin products such as a residual pulping liquor may be subjected to various treatments such as, for example, acid, alkaline or heat treatments or reacted with the other chemicals which may further alter somewhat the lignin constituents. The lignins remain operative as long as the treatment is not so severe as to destroy the basic polymeric structure or substantially decrease the phenolic hydroxyl content of the lignin.

The residual pulping liquors, or the lignin-containing product obtained in the separation or recovery of lignins from the plant, will generally contain lignins of various molecular weights varying from less than 1,000 to over 100,000. These liquors also may contain other constituents besides the lignins. For example, in the sulfite pulping process, the spent sulfite liquor contains lignosulfonates which may be present as salts of cations, such as magnesium, calcium, ammonium, sodium and other cations which may have been present during the sulfonation of the lignin. The spent sulfite liquor generally contains only about 40 to 60 weight percent of an oven dried basis of lignosulfonates with the remainder being carbohydrates and other organic and inorganic constituents dissolved in the liquor. Lignin products obtained by other pulping processes may likewise contain other materials such as carbohydrates, degradation products of carbohydrates, and resinous materials which are separated from the lignocellulosic materials with the lignin. Lignin obtained by hydrolysis of lignocellulosic materials may not contain the carbohydrates but may contain resinous type materials as well as other materials which are not removed by the hydrolysis. It is not necessary to separate the lignin-containing constituents from the other constituents. The lignin product as obtained containing all of the constituents may be used as such or subjected to different treatments such as alkaline, acid, or heat treatments as well as reacted with chemicals to modify or remove some of the non-lignin constituents prior to the cross-linking reaction. Alkaline treatment of the lignins has a tendency to increase the phenolic hydroxyl content and also to enhance the flocculating properties of the final cross-linked product under alkaline conditions. The reaction of the polyoxyalkylene cross-linking agent with the non-lignin constituents is not excessive and the presence of the products of reaction of these constituents do not materially effect flocculating properties of the product. They are generally of relatively low molecular weight and can be easily removed from the final high molecular weight product after reaction, if desired, using methods, such as dialysis, gel permeation chromatography, chemical precipitation such as acid, calcium hydroxide, or amine precipitation, or alcohol or other solvent extraction and other methods well known in the art for the fractionation and recovery of high molecular weight organic polyelectrolytes from lower molecular weight materials. The lignin materials may also be separated from the non-lignin constituents and fractionated in fractions of various molecular weights prior to reaction with the cross-linking agents using these same methods. Improved flocculating agents are obtained by cross-linking or bridging the higher molecular weight lignins with the polyoxyalkylene chains. Thus, in addition to removing the non-lignin constituents, the lignins may be fractionated and the high molecular weight fraction cross-linked with the polyoxyalkylene chains. Prior to fractionation, the lignins, such as spent sulfite liquor, may be polymerized such as by heating under acidic conditions or reacting with relatively small amounts of formaldehyde or other reagents to cross-link the lignin molecules with linkages of from 1 to 3 carbon atoms or having cross-links of about 1 to 4 A. in length. These products are generally polymerized or cross-linked with the short chain agent to the extent that the intrinsic viscosity of the products are in the range of 0.06 to .09 dl./g. Some of the methods and processes for obtaining high molecular weight lignins are disclosed in an article by A. Rezanowich et al., entitled, "The Dispersion of Aqueous Suspensions of Titanium Dioxide by Water Soluble Lignin Derivatives," published in the Pulp and Paper Magazine of Canada, 62, C, T–172 (1961); an article by Julius Benko subtitled, "The Effect of Molecular Size on Surface Active and Other Properties of Lignosulfonates," published in TAPPI, 44, No. 12, 849 (1961); and an article by G. G. Allan et al. entitled, "Enhancement of Water Quality Using Forest-Derived Coagulating Systems, Part I." "The Coagulant and Dispersant Characteristics of Lignosulphonates," published in the Pulp and Paper Magazine of Canada, vol. 71, No. 1, T–50 (1970).

The polyoxyalkylene diester of dihalide used for cross-linking lignin molecules are the polyoxyalkylene di-esters and dihalides having oxyalkylene repeating units containing from 2 to 4 carbon atoms. The most readily available di-esters or di-halides are the ones prepared from polyethylene oxide, polypropylene oxide, tetrahydrofuran, and mixtures thereof. However, polyoxyalkylenes prepared from other materials and by other known methods may also be used. The carbon atoms of the repeating unit do not have to be in a straight chain but can be branched as long as the straight chain of the repeating unit is of at least 2 carbon atoms linked to the oxygen. The oxyalkylenes used have sufficient number of repeating units between the ester or halide radicals to provide linkages of a molecular weight of from 120 to 1,000, preferably from 200 to 600. The bridging or linkages thus generally obtained have a length in the range of from 10 to 80 A. Since the lignin molecules are generally considered to be irregular, 3-dimensional molecules of relatively large diameter, a unique composition is thus obtained whereby these large irregular molecules are joined by long chains to provide flexible bonding.

A convenient method for the preparation of the di-ester cross-linking agent is to react a polyalkylene glycol with a sulfonic acid chloride or bromide. The acid halide reacts readily with the terminal hydroxyl groups of the polyalkylene glycol to form the di-esters. The reaction can be illustrated by the following equation.

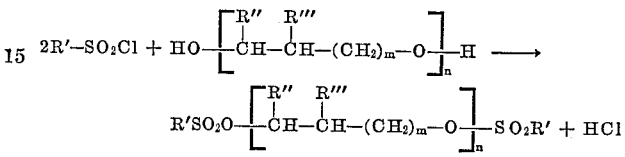

In the equation, R' represents alkyl radicals of from 1 to 6 carbon atoms in length, cyclic radicals of from 3 to 6 carbon atoms such as cyclohexane, or arene radicals of from 6 to 10 carbon atoms such as toluene, p-bromobenzene, benzene, naphthalene, and others such as phenylmethane. R" and R'" represent hydrogen or alkyl radicals of from 1 to 2 carbon atoms in length. The "$n$" represents the number of the repeating units necessary to obtain the desired molecular weight and "$m$" is a number of 0 to 2.

In the reaction of the acid chloride with the polyalkylene glycol, HCl is liberated so that the reaction is generally carried out in the presence of an acid acceptor or a base to maintain alkaline conditions, preferably at a pH of 8 to 9. The base used may be alkali metal or alkaline earth metal oxides, hydroxides or carbonates, or quaternary ammonium hydroxides or carbonates. Tertiary amines may also be used. A convenient means for carrying out the preparation of the ester is to use a tertiary amine such as pyridine as a reaction media. The polyalkylene glycol may be dissolved in an excess pyridine and the acid chloride can be gradually added to the resulting solution. The reaction is vigorous so that room temperature or below is generally used in preparation of the esters. In addition to carrying out the reaction in pyridine, other tertiary amines such as N-methylpiperidine, quinoline, and triethylamine may also be used and will function as the reaction medium as well as the acid acceptor. In addition to using the amines for the reaction medium, the reaction may be carried out in organic solvents such as dioxane, tetrahydrofuran, and dialkyl ethers of alkylene glycols such as 1,2-dimethoxyethane or diglyme. With these solvents, it is generally preferred to use an amine as an acid acceptor; however, dispersion of alkali metal or alkaline earth metal hydroxide, oxide, or carbonate within the organic solvent is likewise operative with the alkali being available to react with the HCl as it is formed. When pyridine is used as a reaction medium, the reaction mixture after reaction is mixed with acidified water to precipitate the di-ester. The di-ester product is then recovered from the mixture by solvent extraction using solvents such as ethyl ether, ethylene chloride, methylene chloride, chloroform, and other volatile halogenated hydrocarbon solvents. The solvent is generally evaporated under reduced pressure from the extracted product to obtain the di-ester.

The di-ester may also be prepared in an aqueous medium by adding the acid chloride to a stirred, aqueous solution of alkali and the polyalkylene glycol. After the reaction, the product is extracted from the reaction mixture and unreacted reactants by use of aromatic solvents such as benzene, toluene, and xylene or the extracting solvents listed above.

In preparation of the dihalides, the polyalkylene glycols are reacted with the halogenating reagents such as thionyl chloride or bromide, phosphorus tribromide, or pentabromide or phosphorus trichloride. The halogenating agent reacts readily with the terminal hydroxyl of the glycol to form the dihalide which may be readily recovered from the reaction mixture by fractional distillation under reduced pressure. The rate of reaction of the halogenating reagents with the polyalkylene glycol is moderated somewhat by carrying out the reaction in presence of an organic solvent.

While the di-esters and dihalides may be purified and recovered from the reaction medium, the di-esters or dihalides may be used or reacted with the lignin without purification except for the removal of the tertiary amine or the organic solvent used for the reaction medium. For example, when the dihalide or di-ester is formed using the organic medium, the halide or the ester as obtained upon evaporation of the organic solvent may be used. If an excess of an inorganic oxide, hydroxide, or carbonate was used as an acid acceptor the alkali remaining with the di-ester or dihalide will dissolve in the aqueous medium used for the reaction of the dihalide or di-ester with a lignin and serve as an acid acceptor for this reaction.

The cross-linking reaction of the lignin is effected generally by adding the di-ester or dihalide to an aqueous lignin solution and carrying out the reaction under alkaline conditions. The presumed reaction obtained is illustrated by the following equation showing the reaction of a disulfonate ester with the lignin.

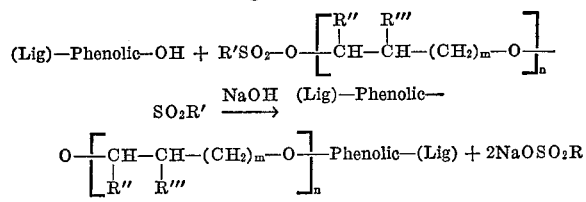

In the above reaction, R', R", and R''', as well as "n" and "m" represent the same entities as indicated in the equation above in the preparation of the cross-linking agent. In the reaction, lignin solutions containing initially at least 20 to 40 weight percent of solids must be used. Generally the most concentrated solution which can be conveniently handled is preferred. The viscosity of the solutions increase relatively rapidly with concentration which limits the concentration that can be employed. For many solutions, concentrations up to 40 weight percent or higher can be conveniently used. Using a concentrated solution promotes inter- instead of intra-molecular cross-linking.

Upon addition of the dihalide or di-ester to the lignosulfonate solution, the reaction mixture is generally heated to a temperature in the range of 50° to 200° C. To avoid the use of pressure equipment, it is generally preferred to heat the mixture from about 80° C. to reflux temperature. The reaction is fairly rapid and, as cross-linking proceeds, the reaction mixture thickens so that additional water may be periodically added to thin the mixture to permit continuing reaction without gelation. Generally a reaction time of from 15 minutes to 5 hours is sufficient to react an effective amount of the di-ester or dihalide with the lignin to impart the desired flocculating properties. The further advantage of using a lower temperature is that the reaction is more gradual and thus can be more closely controlled. After sufficient extent of inter-molecular linking has been obtained, the reaction mixture is neutralized and can be fractionated to recover the high molecular weight cross-linked lignin. Any of the methods commonly known for fractionation of polyelectrolytes or for the recovery of high molecular weight organic compounds from lower molecular weight products may be used. The reaction mixture is commonly dialyzed against running water for periods of time from 8 to 24 hours. If the cross-linked lignin is to be used as a flocculating agent, it is not necessary to recover or remove the low molecular weight constituents from the reaction mixture. The reaction mixture as such may be used. The presence of inorganic salts and the organic sulfonate present in the reaction mixture do not appear to have a deleterious effect upon the flocculation. Often in determining the extent of cross-linking desired, the cross-linking reaction is continued with samples periodically being drawn from the reaction mixture and tested for flocculating properties. The reaction is discontinued when further improvement in flocculating time is not obtained by additional heating or reaction. The amount of the cross-linking agent added to the reaction mixture in reaction with the lignin may be widely varied such that the stoichiometric or equivalent ratio of the cross-linking agent to the phenolic hydroxyl content of the lignin can be in the range of from 0.35 to 1.5 or greater, preferably being in the range of 0.6 to 1.0. A slight equivalent excess of base is also used to react with the acid which will be formed in the reaction. Usually sufficient alkali is used to obtain a pH of 8 to 9 at the end of the reaction or added periodically as the reaction proceeds to maintain the pH in the range of 8 to 9. The alkali metal hydroxides and oxides are preferred. The reaction is generally continued until from about 30 to 80% or more of the phenolic hydroxyl groups have been reacted. This extent of cross-linking or interaction of the lignin with the cross-linking agent will result in obtaining effective products. These products usually will have intrinsic viscosities greater than 0.1 and may be up to 0.7 dl./g. or higher. When an excess of cross-linking agent or of the di-ester is added, preferably the ester is added in increments and the added amount substantially reacted before additional amount is added. By this procedure, the bonding of both ends of the cross-linking agent is favored to bridge the lignins instead of having only one end of the cross-linking agent bonded to the lignin and the other end remaining unbonded.

In using the cross-linked lignins in flocculation of solids from aqueous streams, the methods and procedures commonly employed for other polyelectrolytes or high molecular weight flocculating agents may be used. The cross-linked lignin may be used in an amount of from less than 1 to over 1,000 parts per million. For flocculation of inorganic particles from relatively dilute streams, such as in treatment of water to remove finely dispersed clay or sediment found in streams and other natural waters, an amount of from 5 to 30 parts per million are usually sufficient. The products are also effective for more concentrated effluents which may contain 5 to 10 percent or higher of solids, such as waste effluent streams. In the treatment of waste effluent streams, under acid conditions, the products are effective in the removal of proteinaceous materials dissolved in the effluent streams.

The following examples further illustrate the invention.

EXAMPLE I

A calcium spent sulfite liquor was converted to sodium base lignosulfonate by addition of sodium sulfate to the spent sulfite liquor to precipitate calcium sulfate. The sodium base liquor was dialyzed and the dialyzate obtained was reacted with a disulfonate ester of polyethylene glycol. The dialyzate used had a diffusion coefficient of 8.5 mm.²/day which was determined by the agar gel method as described in J. Amer. Chem. Soc., vol. 81, 2054 (1959) by J. Moacanin et al.

The di-ester used as the cross-linking agent was prepared by reacting polyethylene glycol having an average molecular weight of around 200 with tosyl chloride in pyridine. The polyethylene glycol was dissolved in the pyridine and the tosyl chloride was gradually added to the polyethylene solution at a temperature of around 10°. After the tosyl chloride was added, the reaction mixture was stirred for about 2 hours at room temperature. The amount of tosyl chloride added was slightly more than the equivalent amount necessary to react with all of the hydroxyl groups of the polyethylene glycol. The di-ester product thus prepared was recovered by adding the reaction mixture to acidified ice water and extracting the di-ester product with methylene chloride. The methylene chloride phase was dried by the addition of sodium sulfate and the solvent was then removed by evaporation under reduced pressure. A sulfur analysis indicated that substantially complete esterification of the polyethylene glycol was thus obtained.

Forty-five grams of the spray dried sodium lignosulfonate dialyzate was dissolved in sufficient water to obtain an aqueous solution containing about 33% solids. To this solution, 11.6 grams of the tosylate di-ester and about 2.4 grams of sodium hydroxide were added. Based upon the phenolic hydroxyl content, the amount of the di-esters added was sufficient to react with about 76% of the phenolic hydroxyls of the spent sulfite liquor. The amount of caustic was in an equivalent ratio of about 1.2 to 1 of the phenolic hydroxyls. The reactants were heated in a 3-necked flask and refluxed while the mixture was being stirred. After about 1 hour and 50 minutes, the solution had thickened to an extent that it could no longer be stirred. Additional water in an amount of 150 milliliters was then added along with 2.2 grams of 50% NaOH and the reaction continued at reflux for an additional 10 minutes. The reaction mixture was then cooled, adjusted to a pH of 7 with 6 N sulfuric acid, and dialyzed against running water for 8½ hours. Based upon the ultra-violet difference spectrum analysis of the final product, it was estimated that approximately 64% of the phenolic hydroxyls of the lignin had been reacted.

A second run was made in a manner similar to that above except that 2.9 grams of the di-ester and 1.6 grams of caustic were added to 45 grams of the sodium lignosulfonate dialyzate. The amount of ester added was sufficient to react with about 20% of the phenolic hydroxyls and the caustic added represented a ratio of 0.76 mole of caustic per phenolic hydroxyl. The reactants were heated to reflux and stirred for 6 hours. While some thickening may have been obtained by the heating, the product did not gel. However, some cross-linking was obtained, since upon dialysis of the reaction mixture, the product had a diffusion coefficient of 5.6 which represented an average molecular weight of 66,000 versus the starting molecular weight of the dialyzate of 24,000.

The above products obtained were tested as flocculating agents by the flocculation of clay in an aqueous system. A commercially available low-yield clay (Panther Creek) was dispersed in the water to obtain a dispersion containing about 4 weight percent of clay. Sodium chloride was also added in an amount of about 1,000 parts per million. The test was carried out by shaking 100 milliliter samples of the clay suspension at a pH of about 5 in a 100 milliliter graduated cylinder and then noting the time taken for the boundary line of the clay to settle to half-volume or 50 milliliter mark on the graduate. The settling time was determined for the use of the flocculating agent in an amount of about 10 parts per million. The results obtained were also compared to the flocculating time required for the clay to settle to the half-volume mark when the sodium lignosulfonate dialyzate used as the lignin reactant was also tested at 10 parts per million. The results obtained are shown in the table below:

| Sample | Ratio of diester added to hydroxyl content of lignin | Amount added, p.p.m. | Settling time, seconds |
| --- | --- | --- | --- |
| Na lignosulfonate dialyzate | | 10 | 570 |
| Run: | | | |
| 1 | .76 | 10 | 90 |
| 2 | .20 | 10 | 310 |

The above table indicates that the addition in an amount of di-ester sufficient to react or cross-link with about 20% of the phenolic hydroxyls of the lignin was not sufficient to obtain an effective product. Some improvement, however, over the original lignosulfonate reactant was obtained.

EXAMPLE II

An unfermented calcium base sulfite liquor was fractionated by being passed through a gel permeation column to obtain a 16½% high molecular weight lignosulfonate fraction of the calcium lignosulfonate. The fraction had a diffusion coefficient of 4.9 which represented an average molecular weight of about 90,000. The high molecular weight lignosulfonate in an amount of 30 grams, based upon the dry weight, was dissolved in about 100 milliliters of water and reacted with about 13.4 grams of a tosylate di-ester of polyethylene glycol in the presence of 1.6 grams of sodium hydroxide which was added as a 50% solution. The di-ester was prepared by reacting a polyethylene glycol having an average molecular weight of around 400 with tosyl chloride in a manner similar to that described above. The amount of reactants used represented an equivalent ratio of 1.4 of the ester and 1.6 of sodium hydroxide per equivalent of phenolic hydroxyl of the lignin. The mixture was reacted at reflux temperature for 25 minutes after which an additional 100 milliliters of water were added. The reaction mixture was then refluxed for an added 30 minutes, neutralized and purified by dialysis against running water for 16 hours. The product in an amount of about 32.2 grams was recovered upon evaporation and drying of the dialyzate. The sample was tested as a flocculating agent in settling of clay from a 4% clay slurry in a manner similar to that described above. The results obtained and other details are given in Table I below.

EXAMPLE III

A sample of the high molecular weight lignosulfonate fraction obtained by gel permeation described in Example II was cross-linked with a tosylate di-ester prepared from a polyethylene glycol having a molecular weight of 600. The high molecular weight lignosulfonate fraction in an amount of 15 grams was dissolved in 40 milliliters of water and 3.5 grams of the disulfonate ester were added in the presence of 0.35 gram of sodium hydroxide. The mixture was reacted for 1½ hours at reflux conditions after which the reaction mixture was neutralized and purified by dialysis against running water for 16 hours. The product was obtained in an amount of 13.8 grams. The product was tested as a flocculating agent. The results and other details with respect to the product are given in Table I below.

EXAMPLE IV

A fermented calcium base spent sulfite liquor was fractionated by being passed through a gel permeation column to obtain a high molecular weight fraction of lignosulfonate representing about 23% of the total spent sulfite liquor solids. The high molecular weight lignosulfonate in an amount of 25 grams was dissolved in 80 milliliters of water and 5.6 grams of a tosylate di-ester and 0.6 gram of sodium hydroxide as a 50% solution were added to the lignosulfonate solution. The di-ester was prepared from a polyethylene glycol having an average molecular weight of 200. The reaction mixture was heated and refluxed for 2 hours after which the mixture was neutralized. Upon purification of the reaction mixture by dialysis, 30.0 grams of product were obtained. This product was tested as a flocculating agent. The results and details are shown in Table I below.

EXAMPLE V

The high molecular weight lignosulfonate fraction described in Example IV was cross-linked with a di-ester prepared from a polyethylene glycol having an average molecular weight of 400 instead of 200 as in Example IV. The reaction was carried out in a manner similar to that described in Example IV except that 7.7 grams of the tosylate di-ester were used which gave the same equivalent ratio of the cross-linking agent to the hydroxyl content of the lignin. Upon purification, of the reaction mixture, 27 grams of the final product were obtained. The product was tested as a flocculating agent. The results and other details are given in Table I below.

EXAMPLE VI

A high molecular weight lignosulfonate fraction obtained by fractionation of a fermented calcium base spent sulfite liquor by gel permeation was reacted with a relatively large ratio of cross-linking agent. The spent sulfite liquor fraction had a diffusion coefficient of 6.2 mm.$^2$/day which represented an average molecular weight of 52,000. In the reaction, 60 grams of the spent sulfite liquor were dissolved in 195 grams of water. To the lignosulfonate solution, 20 grams of a tosylate di-ester and 3.2 grams of sodium hydroxide as a 50% solution were added. The di-ester was prepared from a polyethylene glycol having an average molecular weight of 400. The mixture was reacted for 1.5 hours and an additional 0.5 gram of sodium hydroxide was added as a 50% solution, after which additional water was added to a total of 100 milliliters and the reaction continued for 20 minutes. After purification, 72.3 grams of product was obtained. The product obtained was tested as a flocculating agent. The results and other details are given in Table I below.

EXAMPLE VII

A high molecular weight lignosulfonate was recovered from a fermented calcium base spent sulfite liquor by the precipitation of the lignosulfonate by the addition of a polyethylenimine. The precipitated lignosulfonate had a diffusion coefficient of 4.1 which represented an average molecular weight of 140,000. The precipitated lignosulfonate in an amount of 45 grams, on the basis of dry weight, was dissolved in 90 milliliters of water in which 4.45 grams of caustic had been dissolved. To the amine lignosulfonate salt solution, 11.6 grams of a di-ester was added and the mixture reacted at reflux temperature for ½ hour after which 1.0 gram of additional sodium hydroxide was added as a 50% solution. Then 100 additional milliliters of water were added and the reaction continued for an additional 15 minutes. The unpurified product had a dry weight of 60.6 grams and contained about 1.4% nitrogen.

The di-ester used in the above reaction was prepared from a polyethylene glycol having an average molecular weight of 200. The final product was tested as a flocculating agent. The results obtained are indicated in Table I below.

EXAMPLE VIII

An alkaline treated lignosulfonate was cross-linked with a cross-linking agent prepared from a polyethylene glycol having a molecular weight of around 400 by the reaction of tosyl chloride with a polyethylene glycol.

A sodium-base spent sulfite liquor was treated with sodium hydroxide in an amount of 36 weight percent, based upon the spent sulfite liquor solids, and the mixture heated for 80 hours at 90 to 100° C. After the alkaline treatment, the reaction mixture was treated with sulfuric acid to a pH of about 3.8 precipitating the alkaline treated lignosulfonate. The precipitate was washed, redissolved by adding sodium hydroxide to pH 8.5 and spray dried. It had a phenolic hydroxyl content of about 4%. The alkaline treated lignin in an amount of 15 grams was dissolved in 30 milliliters of water to which 1.5 grams of sodium hydroxide as a 50% solution were added. The cross-linking agent in the amount of 9 grams was added and the mixture was reacted for about 2 hours 25 minutes at reflux. The reaction mixture was then purified by dialysis and the purified product tested as a flocculating agent. The results obtained and other details are given in Table I below.

In the table below, the equivalent ratio of the cross-linking di-ester to the hydroxyl content of the lignin is given. Also, the ratio of the hydroxyl content of the lignin reacted in the final product is included. The phenolic hydroxyl content was determined by the procedure of Otto Goldschmid, "Determination of Phenolic Hydroxyl Content of Lignin Preparations by Ultra-violet-Spectrum, Analytical Chemistry, 26, p. 1421 (1954)." The intrinsic viscosities in the table were determined by the standard method employing a 0.1 molar sodium chloride aqueous solution as a solvent. The settling times are the results of the flocculation tests made in a manner similar to that described in Example I.

TABLE I

| Example: | Equivalent ratio of ester to hydroxyl content of lignin | Fraction of phenolic hydroxyl of lignin reacted | Intrinsic viscosity, dl./g. | Settling time at pH 5, sec. |
| --- | --- | --- | --- | --- |
| II | 1.4 | 0.48 | 0.20 | 92 |
| III | 0.6 | | 0.14 | 110 |
| IV | 0.99 | 0.7 | 0.15 | 136 |
| V | 0.9 | 0.45 | 0.13 | 110 |
| VI | 1.3 | | 0.30 | 90 |
| VII | 0.9 | | | 80 |
| VIII | 0.6 | | .22 | 103 |

EXAMPLE IX

A spent sulfite liquor was polymerized with formaldehyde prior to cross-linking the lignin with polyoxyethylene linkages.

A fermented calcium base spent sulfite liquor (SSL) was converted to the sodium base by addition of sodium sulfate to the fermented calcium base liquor to precipitate the calcium as calcium sulfate. The sodium base liquor was subjected to an alkaline treatment for 16 hours at 90° C. at a pH of about 10. The alkaline treated spent sulfite liquor was condensed with formaldehyde until the formaldehyde polymerized lignosulfonate product had a diffusion coefficient of about 5.6 mm.$^2$/day, which represents an average molecular weight of about 66,000, and had an intrinsic viscosity of about 0.07 dl./g. The polymerized lignosulfonate was cross-linked using as a cross-linking agent a di-ester prepared from polyethylene glycol having an average molecular weight of 400 by reacting the polyethylene glycol with mesyl chloride.

To 15 grams of the polymerized lignosulfonate product, on a dry basis, 30 milliliters of water was added and the polymerized lignosulfonate was dissolved in the water with 0.8 gram of sodium hydroxide. The cross-linking agent was then added in an amount of 3.7 grams and the reaction mixture was heated to reflux temperature and reacted for 80 minutes. The reacted mixture was neutralized and dialyzed against running water for 16 hours using a regenerated cellulose type membrane.

In a second run, sodium base spent sulfite liquor was polymerized with formaldehyde in a manner similar to that described above. The formaldehyde polymerized product was then dialyzed against running water for 16 hours using a regenerated cellulose type membrane. Upon dialysis, the dialyzate obtained had a diffusion coefficient of 4.8 mm.$^2$/day which represented an average molecular weight of 94,000. The dialyzate in an amount of 30 grams was dissolved in 60 milliliters of water to which 1.2 grams of caustic as a 50% solution had been added. To the lignosulfonate solution, 7.5 grams of a cross-linking agent prepared from polyethylene glycol having an average molecular weight of 400 by the reaction of the glycol with tosyl chloride was used. The reaction mixture was reacted at reflux temperature for about 10 minutes. The reaction mixture thickened and 50 milliliters of hot water were added and refluxing continued for an additional 30 minutes. The reaction mixture was neutralized to pH 7 with 6 N H$_2$SO$_4$ and purified by dialysis. The product in an amount of 27.8 grams was thus obtained. The purified product from this run and from the one made above were tested as flocculating agents in a manner described above at levels of 10 parts per million and compared to the results obtained using a lignosulfonate product which had been polymerized with formaldehyde to the extent that an intrinsic viscosity of over 0.33 dl./g. was obtained.

The high molecular weight formaldehyde condensed product was prepared in a manner similar to that described by G. G. Allan et al. in the Pulp and Paper of Canada magazine referred to above. A dialyzed sodium base spent sulfite liquor, which was converted to the sodium base from a fermented calcium base liquor by addition of sodium sulfate, was used. Concentrated (96%) sulfuric acid in an amount of 97% based upon the dialyzate solids was added to a 5 weight percent solution of the dialyzate. To this acidified solution, formaldehyde in an amount of 26% (100% basis) was added and the mixture refluxed for about 22 hours. Additional increments of formaldehyde of the same size as the first were added with continued refluxing until a total of 130 weight percent had been added at the end of 74 hours. Refluxing was continued for an additional 16 hours. The polymerized lignosulfonate thus obtained had an intrinsic viscosity of 0.33 dl./g. after being treated with calcium hydroxide to remove the sulfate ions. This product was also tested as a flocculating agent. The results obtained and other details of the tests made are shown below.

| Sample | Equivalent ratio of cross-linking agent to phenolic hydroxyl content | Intrinsic viscosity, dl./g. | Flocculating time at pH 5, sec. |
| --- | --- | --- | --- |
| Cross-linked formaldehyde reacted SSL | 1.2 | | 120 |
| Cross-linked dialyzate of formaldehyde reacted SSL | .7 | .39 | 52 |
| Formaldehyde polymerized SSL | | .33 | 325 |

The cross-linked dialyzate of formaldehyde reacted spent sulfite liquor was also tested as a flocculating agent in an amount of 1,000 parts per million. The settling rate of the 4% clay slurry at 1,000 parts per million was 45 seconds at pH 5 and 55 seconds at pH 9.

EXAMPLE X

An alkaline treated calcium base spent sulfite liquor similar to that described in Example VIII above was cross-linked with a tosylate di-ester of a polyethylene glycol having an average molecular weight of 400. The alkaline treated product thus obtained was tested as a fluocculating agent under both acid and alkaline conditions.

The alkaline treated lignosulfonate in an amount of 11.5 grams was dissolved in about 23 milliliters of water to which 2.2 grams of sodium hydroxide as a 50% solution had been added. To the alkaline treated lignin solution, 7 grams of the cross-linking agent were added and the product was heated at reflux temperature. An additional 75 milliliters of water was added after the initial thickening which occurred after about 20 minutes of reaction. The ratios of reactants used was such that the equivalent ratio of the cross-linking agent to aromatic hydroxyl content of the lignin was 0.7. The reaction mixture was purified by dialysis and 13.8 grams of product was thus obtained. The product was tested as a flocculating agent in a manner similar to that described in Example I above except that an additional flocculating test was also made when the clay solution had been adjusted to a pH of 9. The flocculating agent in both the runs made was used in a concentration of 10 parts per million. The results obtained are shown below.

Flocculating time, secs.
pH 5 _____ 82
pH 9 _____ 85

EXAMPLE XI

Kraft lignin and a spent sulfite liquor were cross-linked and the purified and unpurified resulting reaction products tested as flocculating agents. The cross-linking agent used was the diester prepared by the reaction of tosyl chloride with a polyethylene glycol having an average molecular weight of 400.

Kraft lignin in an amount of 15 grams was dissolved in water with about 1.7 grams of sodium hydroxide to obtain a solution containing 32 weight percent of kraft lignin solids. To this solution, 9.1 grams of the di-ester cross-linking agent were added. In the amounts used, the equivalent ratio of the cross-linking agent to the hydroxyl content of the kraft lignin was 0.4. After refluxing the reaction mixture for 40 minutes, the reaction mixture thickened to the extent that 50 milliliters of water were added and the reaction continued for an additional 10 minutes. After reaction, the reaction mixture was divided and a portion of the mixture was purified by dialysis while the other portion was not purified. Both the purified and unpurified reaction products were tested as flocculating agents under pH conditions of 5 and 9. The purified cross-linked product had an intrinsic viscosity of about 0.22 dl./g.

The spent sulfite liquor cross-linked was a fermented calcium base liquor which was converted to a sodium base and subjected to an alkaline treatment by heating the mixture with caustic at a temperature of about 90° for 24 hours such that at the end of the heating, the pH of the mixture was about 10. The resutling alkaline solution obtained was cross-linked by the addition to the alkaline solution of the cross-linking agent. The equivalent ratio of the di-ester cross-linking agent used to the phenolic hydroxyl content of the alkaline treated liquor was 1. The reaction mixture was refluxed for about 25 minutes after which a portion of the reaction reaction mixture was purified by dialysis against running water for 16 hours and the remaining portion was not purified. Both the purified and unpurified products were tested as flocculating agents under both acid and alkaline conditions at 10 parts per million addition. The purified cross-linked spent sulfite liquor had an intrinsic viscosity of about 0.28 dl./g.

The results obtained for the flocculating tests are shown below.

| Sample | Flocculating time, seconds | |
| --- | --- | --- |
| | pH 5 | pH 9 |
| Cross-linked kraft lignin: | | |
| Purified | 105 | 88 |
| Unpurified | 108 | 93 |
| Cross-linked, alkaline treated spent sulfite liquor: | | |
| Purified | 82 | 85 |
| Unpurified | 85 | 104 |

EXAMPLE XII

A cross-linked lignosulfonate was used in the precipitation of protein. One of the products used was the polyoxyalkylene cross-linked high molecular weight lignosulfonates described in the second run of Example IX above. A second sample was also tested which was obtained by cross-linking a formaldehyde polymerized lignosulfonate similar to that used above with a tosylate diester of polypropylene glycol.

The di-ester of polypropylene glycol was prepared by reacting polypropylene having a molecular weight of around 400 wiht tosyl chloride in pyridine. The di-ester was reacted with the dialyzed formaldehyde polymerized lignosulfonate in an equivalent ratio of 0.37 to 1 of the di-ester to the phenolic hydroxyl content of the lignosulfonate. In the reaction, about 10.7 grams of the formaldehyde-polymerized lignosulfonate was dissolved in 20 milliliters of water to which 0.45 gram of caustic had been added. Also, 10 milliliters of ethyl alcohol was added to increase the solubility of the polypropylene tosylate di-ester in the reaction mixture. The polypropylene tosylate di-ester was added in an amount of 1.4 grams and the reaction mixture refluxed for about 17½ hours. The product obtained was dialyzed and used for the recovery of protein from aqueous solutions.

In the protein recovery, gelatin was added to water in an amount of 9.4 grams per liter. To 20 milliliters of the gelatin solution, the cross-linked lignosulfonate was added in an amount of about 66% of the gelatin content in solution. Sulfuric acid was added to obtain a solution having a pH in the range of 3.5 to 3.8. The mixture was agitated and then centrifuged for 5 minutes at 6,000 r.p.m. The precipitate obtained was washed with water, dried, and weighed and the nitrogen content determined by the Kjeldahl method from which the percent recovery of the protein was determined. The results obtained were compared to the recovery of protein from the solution using fermented spent sulfite liquor. With the cross-linked lignosulfonates, 95.5% of the protein was recovered using the polypropylene cross-linked lignosulfonate and 96% of the protein with the polyethylene cross-linked product. With the spent sulfite liquor, only 89% of the protein was recovered. With the spent sulfite liquor, the supernatant liquid obtained was hazy while with both of the cross-linked lignosulfonates, the remaining solution was clear.

What is claimed is:

1. A water-soluble composition of lignin cross-linked with polyoxyalkylene linkages to the extent that the lignin composition has an intrinsic viscosity greater than 0.1 dl./g., said linkages having a molecular weight of from 120 to 1,000 prepared by reacting the lignin as an aqueous solution at a concentration of at least 20 weight percent with a polyoxyalkylene compound selected from the group consisting of polyoxyalkylene di-esters of monosulfonic acids and polyoxyalkylene dihalides under alkaline conditions, said di-esters and dihalides having oxyalkylene repeating units of from 2 to 4 carbon atoms.

2. A composition of claim 1 wherein the polyoxyalkylene compound reacted with the lignin is a polyoxyalkylene di-ester of a monosulfonic acid.

3. A composition of claim 2 wherein the lignin is a lignosulfonate and the polyoxyalkylene di-ester is a polyoxyethylene di-ester prepared by reacting a polyethylene glycol with a sulfonic acid halide selected from the group consisting of alkane sulfonic acid halides having from 1 to 6 carbon atoms, cyclic hydrocarbon sulfonic acid halides having from 3 to 6 carbon atoms, and arene sulfonic acid halides having from 6 to 10 carbon atoms.

4. A composition of claim 3 wherein the polyoxyethylene di-ester is prepared by reacting a polyethylene glycol having a molecular weight in the range of 200 ot 600 with tosyl chloride.

5. A water-soluble composition of lignin cross-linked with polyoxyalkylene linkages prepared by reacting the lignin with a polyoxyalkylene compound selected from the group consisting of polyoxyalkylene di-esters of monosulfonic acids and polyoxyalkylene dihalides in an aqueous medium under alkaline conditions, said lignin being reacted with the polyoxyalkylene compound to the extent that from 30 to 80% of the phenolic hydroxyl content of the lignin has been reacted, and said cross-linking linkages having a molecular weight of from 120 to 1,000 and oxyalkylene repeating units of from 2 to 4 carbon atoms.

6. A composition according to claim 5 wherein the lignin is intermixed with the polyoxyalkylene compound in a stoichiometric ratio of from 0.35:1 to 1.5:1 of the polyoxyalkylene compound to the lignin based upon the phenolic hydroxyl content of the lignin and reacted at a temperature in the range of 50 to 200° C. for from ¼ to 5 hours.

7. A compound according to claim 6 wherein the polyoxyalkylene compound is a polyoxyethylene di-ester of a monosulfonic acid.

8. A composition according to claim 7 wherein the polyoxyethylene di-ester is prepared by reacting a polyethylene glycol having a molecular weight in the range of 200 to 600 with a sulfonic acid halide.

9. A composition according to claim 8 wherin the lignin is a lignosulfonate.

10. A composition according to claim 9 wherein the lignosulfonate is a lignosulfonate polymerized with a polymerizing agent forming linkages having from 1 to 3 carbon atoms to the extent that the intrinsic viscosity of the polymerized lignosulfonate is less than about 0.09 dl./g.

11. A composition according to claim 10 wherein the lignosulfonate is polymerized with formaldehyde.

12. A composition according to claim 8 wherein the lignin is an alkali lignin.

13. A process for cross-linnking lignin which comprises reacting the lignin in an aqueous alkaline solution at a concentration of at least 20 weight percent with a polyoxyalkylene compound selected from the group consisting of polyoxyalkylene di-esters of monosulfonic acids and polyoxyalkylene dihalides to cross-link the lignin to the extent that the intrinsic viscosity of the cross-linked lignin is increased to at least 0.1 dl./g., said di-esters and dihalides having an oxyalkylene group of a molecular weight in the range of 120 to 1,000 and of oxyalkylene repeating units of from 2 to 4 carbon atoms.

14. A process according to claim 13 wherein the polyoxyalkylene compound reacted with the lignin is a polyoxyalkylene di-ester of a monosulfonic acid.

15. A process according to claim 14 wherein the lignin is a lignosulfonate and the di-ester is a polyoxyethylene di-ester prepared by reacting a polyethylene glycol with a sulfonic acid halide selected from the group consisting of alkane sulfonic acid halides having from 1 to 6 carbon atoms, cyclic hydrocarbon sulfonic acid halides having from 3 to 6 carbon atoms, and arene sulfonic acid halides having from 6 to 10 carbon atoms.

16. The process according to claim 14 wherein the polyoxyethylene di-ester is prepared by reacting a polyethylene glycol having a molecular weight in the range of 200 to 600 with tosyl chloride.

17. The process for cross-linking lignin which comprises mixing an aqueous alkaline solution of lignin at a concentration of from 20 to 40 weight percent with a polyoxyalkylene compound selected from the group consisting of polyoxyalkylene di-esters of monosulfonic acids and polyoxyalkylene dihalides in an equivalent ratio of the polyoxyalkylene compound to the phenolic hydroxyl content of the lignin in the range of from 0.35:1 to 1.5:1, reacting the mixture at a temperature of from 50° to 200° C. until the lignin is cross-linked to the extent that the intrinsic viscosity of the cross-linked lignin is at least 0.1 dl./g., said reaction being effected with dilution of the reaction mixture by addition of water to prevent gelation of the reaction mixture, and said polyoxyalkylene esters and dihalides having an oxyalkylene group of a molecular weight in the range of 120 to 1,000 and of oxyalkylene repeating units of from 2 to 4 carbon atoms.

18. A process according to claim 17 wherein the mixture is reacted at a temperature of from 50° to 200° C. until from 30% to 80% of the phenolic hydroxyl content of the lignin has been reacted.

19. A process according to claim 18 wherein the polyoxyalkylene compound is intermixed with the lignin in an equivalent ratio of the polyoxyalkylene compound to the phenolic hydroxyl content of the lignin in the range of 0.6:1 to 1:1 and the mixture reacted at a temperature of from 80° C. to reflux for from ¼ to 5 hours.

20. A process according to claim 19 wherein the lignin is an alkali lignin and the polyoxyalkylene compound is a polyoxyethylene di-ester of a monosulfonic acid, said compound having an oxyalkylene group of from 200 to 600 molecular weight.

21. A process according to claim 20 wherein the lignin is a lignosulfonate and the polyoxyalkylene compound is a polyoxyethylene di-ester of a monosulfonic acid, said compound having an oxyalkylene group of a molecular weight in the range of from 200 to 600.

22. A process according to claim 21 wherein the lignosulfonate is a lignosulfonate polymerized with formaldehyde to the extent that the intrinsic viscosity of the polymerized lignosulfonate is less than 0.7 dl./g.

References Cited

UNITED STATES PATENTS

| | | | |
|---|---|---|---|
| 3,197,447 | 7/1965 | Talet | 260—124 R |
| 3,578,651 | 5/1971 | Ludwig | 260—124 C |

FOREIGN PATENTS

| | | | |
|---|---|---|---|
| 487,953 | 9/1918 | France | 260—124 C |

ELBERT L. ROBERTS, Primary Examiner

D. R. PHILLIPS, Assistant Examiner

U.S. Cl. X.R.

210—53, 54; 260—124 B, 124 C, 456 R, 456 P